(12) United States Patent
Kadota

(10) Patent No.: US 7,062,409 B2
(45) Date of Patent: Jun. 13, 2006

(54) SYSTEM FOR, METHOD OF AND COMPUTER PROGRAM PRODUCT FOR DETECTING FAILURE OF MANUFACTURING APPARATUSES

(75) Inventor: Kenichi Kadota, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/670,330

(22) Filed: Sep. 26, 2003

(65) Prior Publication Data

US 2005/0021299 A1    Jan. 27, 2005

(30) Foreign Application Priority Data

Jul. 10, 2003    (JP) .............................. 2003-195124

(51) Int. Cl.
  *G06F 15/00*    (2006.01)
(52) U.S. Cl. ...................................... 702/182; 700/108
(58) Field of Classification Search ................ 702/182, 702/108, 81–84; 356/237.4; 700/109, 108
See application file for complete search history.

(56) References Cited

U.S. PATENT DOCUMENTS 5,274,434 A * 12/1993 Morioka et al. ......... 356/237.4
5,726,920 A * 3/1998 Chen et al. ................. 702/108
2004/0073327 A1* 4/2004 Shimada et al. ............ 700/108

FOREIGN PATENT DOCUMENTS

JP    2002-323924    11/2002

OTHER PUBLICATIONS

Laura Peters, "Graphically Analyzing Yield Loss", Semiconductor International, Oct. 1999, p. 54.

* cited by examiner

*Primary Examiner*—Michael Nghiem
*Assistant Examiner*—Xiuqin Sun
(74) *Attorney, Agent, or Firm*—Oblon, Spivak, McClelland, Maier & Neustadt, P.C.

(57) ABSTRACT

A method of detecting failure of manufacturing apparatuses has: identifying a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used; identifying a downward-tendency apparatus having a significant downward tendency in yield compared with the other manufacturing apparatus by comparing recent yield trends of the plurality of manufacturing apparatuses; and issuing multi-level warnings to the low-yield-period apparatus and the downward-tendency apparatus.

22 Claims, 11 Drawing Sheets

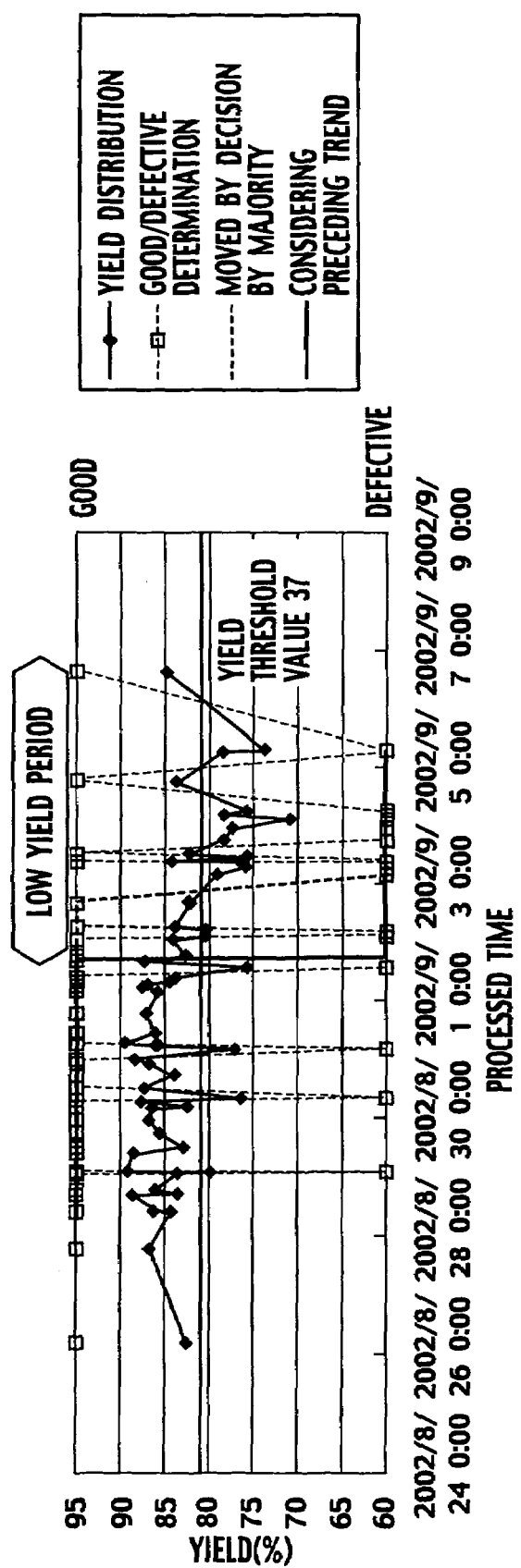

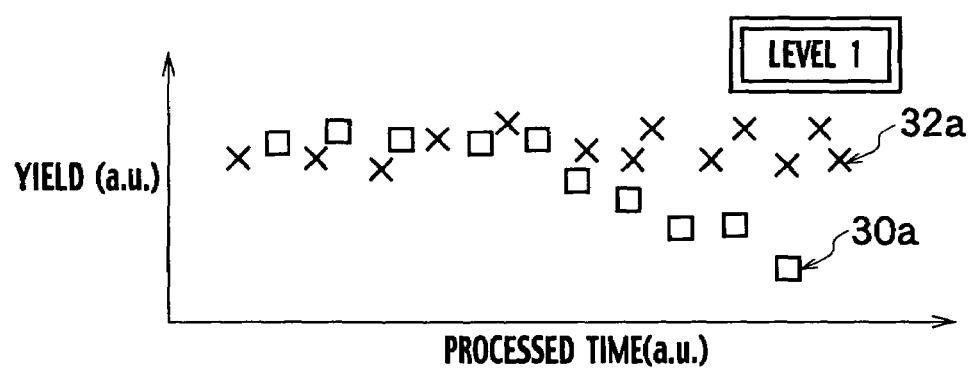

FIG. 14

| PARAMETER | PROCESS | APPARATUS | AVERAGE | MEDIAN | LOT | RESULT | p-VALUE (SIGNIFICANT DIFFERENCE FROM OTHER APPARATUS) | SIGNIFICANT WORST APPARATUS/NOT | SIGNIFICANTLY LOWER YIELD PERIOD | SIGNIFICANT DOWNWARD TENDENCY IN RECENT YIELD | CORRELATION COEFFICIENT R |
|---|---|---|---|---|---|---|---|---|---|---|---|
| ALL-BIT GOOD PRODUCT RATE | DR24 | DF10 | 85.77 | 86.619 | 92 | LEVEL3 | 0.001272916 | SIGNIFICANT WORST APPARATUS | NONE | NONE | |
| ALL-BIT GOOD PRODUCT RATE | R4V4 | RI03 | 85.796 | 86.775 | 50 | LEVEL3 | 0.004284372 | SIGNIFICANT WORST APPARATUS | RECOVERED | NONE | |
| ALL-BIT GOOD PRODUCT RATE | CT24 | CP01 | 84.636 | 83.435 | 8 | LEVEL3 | 0.008150972 | SIGNIFICANT WORST APPARATUS | RECOVERED | NONE | |
| D/S YIELD | AAA4 | AX06 | 92.662 | 93.223 | 15 | LEVEL2 | 0.009073151 | SIGNIFICANT WORST APPARATUS | CONTINUED | NONE | |
| D/S YIELD | WGC2 | JB03 | 92.805 | 93.141 | 20 | LEVEL2 | 0.002312551 | SIGNIFICANT WORST APPARATUS | CONTINUED | NONE | |
| D/S YIELD | DR24 | DF10 | 92.921 | 93.742 | 92 | LEVEL3 | 0.001645522 | SIGNIFICANT WORST APPARATUS | NONE | NONE | |
| D/S YIELD | OCS3 | QP44 | 92.781 | 92.805 | 16 | LEVEL3 | 0.001499344 | SIGNIFICANT WORST APPARATUS | RECOVERED | NONE | |
| D/S YIELD | RM14 | RC04 | 92.631 | 93.456 | 34 | LEVEL3 | 0.009374769 | SIGNIFICANT WORST APPARATUS | RECOVERED | NONE | |
| D/S YIELD | R4V4 | RI03 | 92.987 | 93.477 | 50 | LEVEL3 | 0.009740123 | SIGNIFICANT WORST APPARATUS | RECOVERED | NONE | |
| D/S YIELD | PM44 | PV01 | 93.602 | 93.871 | 44 | LEVEL3 | 0.003759372 | SIGNIFICANT WORST APPARATUS | RECOVERED | NONE | |
| D/S YIELD | CT24 | CP01 | 92.25 | 92.242 | 8 | LEVEL3 | 0.005575765 | SIGNIFICANT WORST APPARATUS | RECOVERED | NONE | |
| DC-Yield | Q2V5 | QV63 | 98.402 | 98.474 | 29 | LEVEL3 | 0.008005144 | SIGNIFICANT WORST APPARATUS | NONE | NONE | |
| FUNCTION YIELD | AAA4 | AX06 | 93.198 | 93.619 | 15 | LEVEL3 | 0.009658828 | SIGNIFICANT WORST APPARATUS | CONTINUED | NONE | |
| FUNCTION YIELD | DR24 | DF10 | 93.348 | 94.006 | 92 | LEVEL3 | 0.002022407 | SIGNIFICANT WORST APPARATUS | NONE | NONE | |
| FUNCTION YIELD | OCS3 | QP44 | 93.191 | 93.256 | 16 | LEVEL3 | 0.002373451 | SIGNIFICANT WORST APPARATUS | RECOVERED | NONE | |
| ALL-BIT GOOD PRODUCT/DEFECTIVE PRODUCT RATIO | DR24 | DF10 | 14.23 | 13.381 | 92 | LEVEL3 | 0.001272916 | SIGNIFICANT WORST APPARATUS | NONE | NONE | |
| ALL-BIT GOOD PRODUCT/DEFECTIVE PRODUCT RATIO | R4V4 | RI03 | 14.204 | 13.225 | 50 | LEVEL3 | 0.004284372 | SIGNIFICANT WORST APPARATUS | RECOVERED | NONE | |
| ALL-BIT GOOD PRODUCT/DEFECTIVE PRODUCT RATIO | CT24 | CP01 | 15.364 | 16.565 | 8 | LEVEL3 | 0.008150972 | SIGNIFICANT WORST APPARATUS | CONTINUED | NONE | |
| D/S DEFECTIVE PRODUCT RATE | AAA4 | AX06 | 7.338 | 6.7773 | 15 | LEVEL2 | 0.009073151 | SIGNIFICANT WORST APPARATUS | CONTINUED | NONE | |
| D/S DEFECTIVE PRODUCT RATE | WGC2 | JB03 | 7.1945 | 6.6589 | 20 | LEVEL2 | 0.002312551 | SIGNIFICANT WORST APPARATUS | CONTINUED | NONE | |
| D/S DEFECTIVE PRODUCT RATE | DR24 | DF10 | 7.0786 | 6.2583 | 92 | LEVEL3 | 0.001645522 | SIGNIFICANT WORST APPARATUS | NONE | NONE | |
| D/S DEFECTIVE PRODUCT RATE | OCS3 | QP44 | 7.2189 | 7.1952 | 16 | LEVEL3 | 0.001499344 | SIGNIFICANT WORST APPARATUS | RECOVERED | NONE | |
| D/S DEFECTIVE PRODUCT RATE | RM14 | RC04 | 7.3686 | 6.544 | 34 | LEVEL3 | 0.009374769 | SIGNIFICANT WORST APPARATUS | RECOVERED | NONE | |
| D/S DEFECTIVE PRODUCT RATE | R4V4 | RI03 | 7.0132 | 6.5225 | 50 | LEVEL3 | 0.009740123 | SIGNIFICANT WORST APPARATUS | RECOVERED | NONE | |
| D/S DEFECTIVE PRODUCT RATE | PM44 | PV01 | 6.3977 | 6.1289 | 44 | LEVEL3 | 0.003759372 | SIGNIFICANT WORST APPARATUS | RECOVERED | NONE | |
| D/S DEFECTIVE PRODUCT RATE | CT24 | CP01 | 7.7502 | 7.7578 | 8 | LEVEL3 | 0.005575765 | SIGNIFICANT WORST APPARATUS | RECOVERED | NONE | |

FIG. 15A
| PROCESS | R4V4 |
|---|---|
| APPARATUS | RI03 |
| DETERMINATION | LEVEL3 |
| p-VALUE (SIGNIFICANT DIFFERENCE FROM OTHER APPARATUS) | 0.004284372 |
| SIGNIFICANT WORST APPARATUS/NOT | SIGNIFICANT WORST APPARATUS |
| SIGNIFICANTLY LOWER YIELD PERIOD | RECOVERED |
| SIGNIFICANT DOWNWARD TENDENCY IN RECENT YIELD | NONE |
← CORRELATION COEFFICIENT R
FIG. 15B
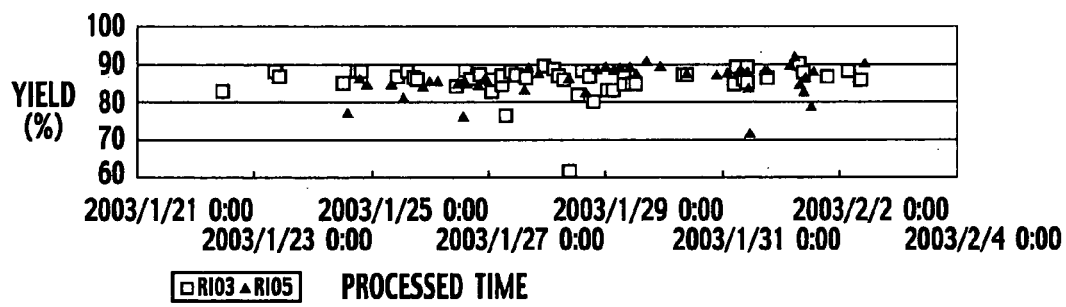
FIG. 15C
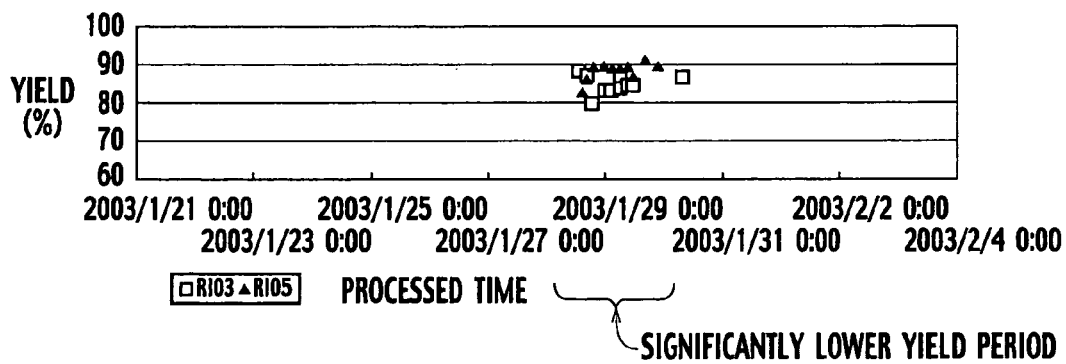

SYSTEM FOR, METHOD OF AND COMPUTER PROGRAM PRODUCT FOR DETECTING FAILURE OF MANUFACTURING APPARATUSES

CROSS REFERENCE TO RELATED APPLICATIONS

This application is based upon and claims the benefit of priority from the prior Japanese Patent Application No. P2003-195124 filed on Jul. 10, 2003; the entire contents of which are incorporated herein by reference.

BACKGROUND OF THE INVENTION

1. Field of the Invention

The present invention relates to a system for detecting failure of manufacturing apparatuses, a method of detecting failure of manufacturing apparatuses, and a computer program product for detecting failure of manufacturing apparatuses and, more particularly, to a technology for detecting a manufacturing apparatus poor in yield from a plurality of manufacturing apparatuses which are used in parallel in a specific manufacturing process.

2. Description of Related Art

In general, a plurality of manufacturing apparatuses are often used in parallel in a manufacturing process in a production line of semiconductor devices. When the yield of lots processed by a manufacturing apparatus from among the plurality of manufacturing apparatuses is lower than those of the other manufacturing apparatuses, there is a possibility that the cause of the lower yield is inherent to the manufacturing apparatus. Therefore, in order to improve the yields of the manufacturing apparatuses, it is required that the failing manufacturing apparatus be detected early in order to analyze the cause of the lower yield. In the related art, differences in yield distributions between manufacturing apparatuses are usually analyzed without considering time axes in detecting a failing manufacturing apparatus.

However, when the plurality of manufacturing apparatuses are used unevenly in terms of time, analyzing only the differences of the yield distributions without considering the time axes may lower the capability to detect failing manufacturing apparatuses and produce false reports. Furthermore, when the number of target lots is increased in order to reduce false reports in number and raise the capability to detect failing manufacturing apparatuses, early detection of failing manufacturing apparatuses becomes difficult.

SUMMARY OF THE INVENTION

A first aspect of the present invention provides a system for detecting failure of manufacturing apparatuses having: a low-yield detecting portion which identifies a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used; a downward-tendency detecting portion which identifies a downward-tendency apparatus having a significant downward tendency in yield compared with the other manufacturing apparatus by comparing recent yield trends of the plurality of manufacturing apparatuses; a warning issuing portion which issues multi-level warnings to the low-yield-period apparatus and the downward-tendency apparatus; and a yield data storing portion which stores yield data of the plurality of manufacturing apparatuses for each time period when the manufacturing apparatuses were used.

A second aspect of the present invention provides a method of detecting failure of manufacturing apparatuses having: identifying a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used; identifying a downward-tendency apparatus having a significant downward tendency in yield compared with the other manufacturing apparatus by comparing recent yield trends of the plurality of manufacturing apparatuses; and issuing multi-level warnings to the low-yield-period apparatus and the downward-tendency apparatus.

A third aspect of the present invention provides a computer program product for detecting failure of manufacturing apparatuses having: an instruction configured to identify a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used; an instruction configured to identify a downward-tendency apparatus having a significant downward tendency in yield compared with the other manufacturing apparatus by comparing recent yield trends of the plurality of manufacturing apparatuses; and an instruction configured to issue multi-level warnings to the low-yield-period apparatus and the downward-tendency apparatus.

BRIEF DESCRIPTION OF THE DRAWINGS

FIG. 6 is a graph showing an example of a procedure in which a yield threshold determining portion of FIG. 2 detects a period when yields are lower than a yield threshold value;

FIG. 7 is a graph showing an example of the yield distribution of a manufacturing apparatus to which a warning issuing portion of FIG. 1 issues a warning of "level 1";

FIG. 8 is a graph showing an example of the yield distribution of a manufacturing apparatus to which the warning issuing portion of FIG. 1 issues a warning of "level 2;"

FIG. 14 is a table showing an example of results of collecting data of failure detected in manufacturing apparatuses, the results being stored in an output data storing portion of FIG. 1 or supplied by an output unit of FIG. 1;

FIG. 15A is a table showing an example of results of detecting failure of a specific manufacturing apparatus, the results being supplied by the output unit of FIG. 1;

FIG. 15B is a graph showing an example of the yield distributions of manufacturing apparatuses stored in a yield data storing portion of FIG. 1; and FIG. 15C is a graph selectively showing a significantly lower yield period obtained based on the results of detecting failure in FIG. 15A from among the yield distributions in FIG. 15B.

DETAILED DESCRIPTION OF EMBODIMENTS

Figure 1:
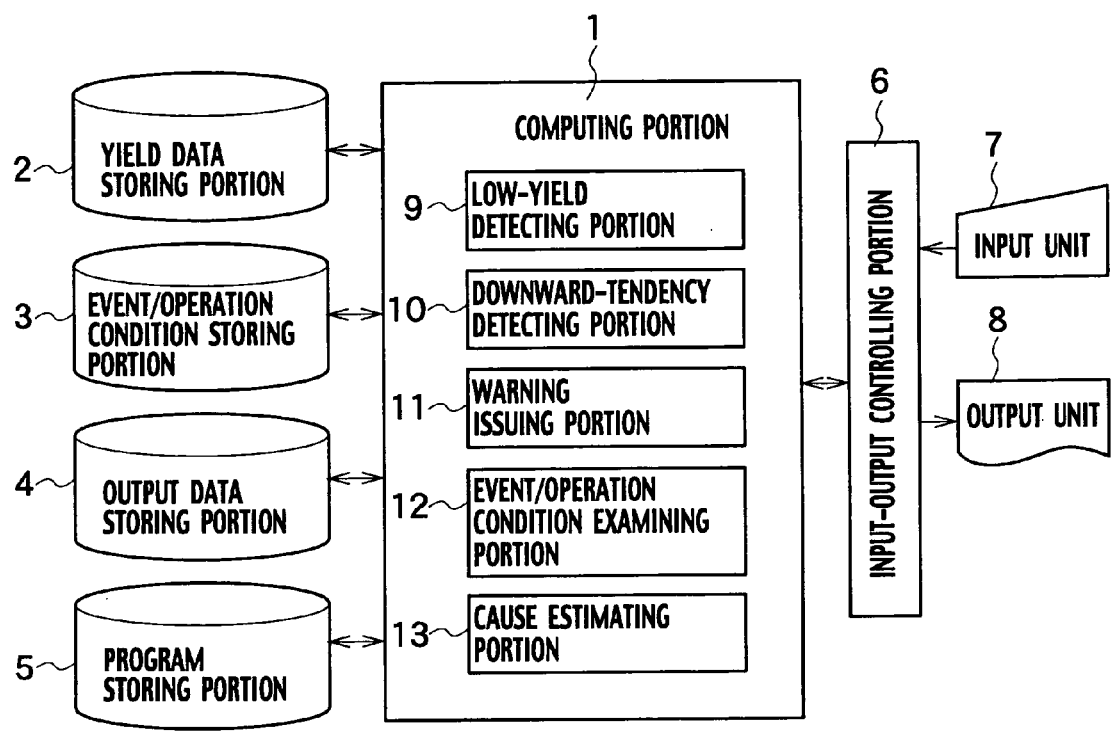
FIG. 1 is a block diagram showing a system for detecting failure of manufacturing apparatuses according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

<System for Detecting Failure>

As shown in FIG. 1, a system for detecting failure of semiconductor manufacturing apparatuses (hereinafter, manufacturing apparatuses for short) according to an embodiment of the present invention includes a computing portion 1 having a function to detect a manufacturing apparatus which has a low yield period and a manufacturing apparatus which has a downward tendency in yield, and a function to issue multi-level warnings to these manufacturing apparatuses; a yield data storing portion 2 connected with the computing portion 1; an event/operation condition storing portion 3; an output data storing portion 4; and a program storing portion 5. The computing portion 1 includes a low-yield detecting portion 9, a downward-tendency detecting portion 10, a warning issuing portion 11, an event/operation condition examining portion 12, and a cause estimating portion 13.

The low-yield detecting portion 9 identifies a manufacturing apparatus having a significantly lower yield period (hereinafter, referred to as low-yield-period apparatus) compared with the other manufacturing apparatuses and the significantly lower yield period by comparing the yields of a plurality of manufacturing apparatuses used in parallel in a specific manufacturing process for each time period when the manufacturing apparatuses were used.

The downward-tendency detecting portion 10 identifies a manufacturing apparatus having a significant downward tendency in yield (hereinafter, referred to as downward-tendency apparatus) compared with the other manufacturing apparatuses by comparing the recent trends in yield of the plurality of manufacturing apparatuses.

The warning issuing portion 11 issues the multi-level warnings to the low-yield-period apparatus and the downward-tendency apparatus. The warning issuing portion 11 issues warnings in several levels depending on whether or not the significantly lower yield period of the low-yield-period apparatus still continues and whether or not the low-yield-period apparatus has the significant downward tendency in yield at present compared with the other manufacturing apparatuses.

The event/operation condition examining portion 12 examines whether or not maintenance, inspection, repair or component replacement was performed on the low-yield-period apparatus before and after the significantly lower yield period identified by the low-yield detecting portion 9, and whether or not operational conditions for the low-yield-period apparatus have been changed.

The cause estimating portion 13 estimates a cause of the low yield of the low-yield-period apparatus based on the examination results of the event/operation condition examining portion 12.

The yield data storing portion 2 stores the yield data of the plurality of manufacturing apparatuses for each time period when the manufacturing apparatuses were used. The yield data includes at least one of the good product rate of finished products having experienced a series of manufacturing processes including the specific manufacturing process, the good product rate for the specific manufacturing process, a characteristic quantity representing in number the distribution of defectives in the wafer surface of a semiconductor wafer processed by a manufacturing apparatus as a processed object, and a characteristic quantity representing in number the distribution of the yields in one lot of a group of objects processed by a manufacturing apparatus.

The event/operation condition storing portion 3 stores the history of the maintenance, inspection, repair and component replacement performed on manufacturing apparatuses, and the history of the changes of operating conditions for the manufacturing apparatuses.

The computing portion 1 may be constituted as part of the central processing unit (CPU) of a usual computer system. The low-yield detecting portion 9, the downward-tendency detecting portion 10, the warning issuing portion 11, the event/operation condition examining portion 12, and the cause estimating portion 13 may be constituted by respective exclusive pieces of hardware, or implemented by pieces of software executed by the CPU of a usual computer system to have functions substantially equivalent thereto.

The yield data storing portion 2, the event/operation condition storing portion 3, the output data storing portion 4, and the program storing portion 5 may be constituted by a semiconductor memory such as semiconductor ROM or RAM, or an auxiliary storage unit such as a magnetic disk unit, a magnetic drum unit, or a magnetic tape unit, or may be constituted by the main memory of the CPU.

The computing portion 1 is connected via an input-output controlling portion 6 with an input unit 7 which accepts inputs such as data and commands from an operator and with an output unit 8 which outputs the warnings issued by the warning issuing portion 11 and failure detecting results. The input unit 7 includes a keyboard, a mouse, a light-pen, and a flexible disk unit. The output unit 8 includes a printer, a display unit, etc. The display unit includes displays such as a CRT and a liquid crystal panel.

Program instructions for various processes executed by the computing portion 1 are stored in the program storing portion 5. The program instructions are read by the CPU as needed, and the computing portion 1 in the CPU executes computation-processing. At the same time, data such as numerical information occurred at each stage in a series of computation-processing is temporarily stored in the main memory of the CPU.

Figure 2:
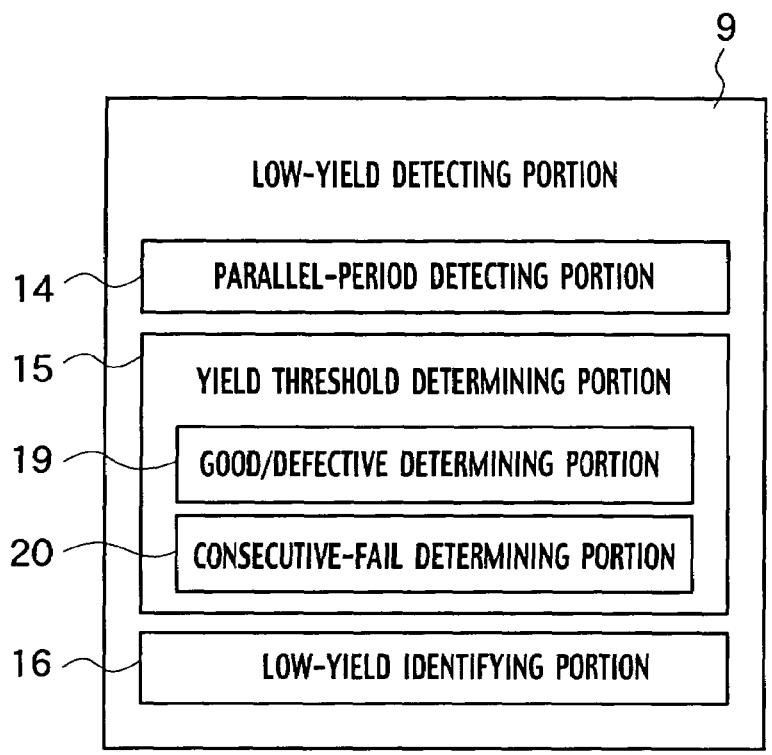
FIG. 2 is a block diagram showing in detail a low-yield detecting portion of FIG. 1.

The low-yield detecting portion 9 of FIG. 1 includes a parallel-period detecting portion 14, a yield threshold determining portion 15, and a low-yield identifying portion 16, as shown in FIG. 2.

The parallel-period detecting portion 14 detects a time period when a plurality of manufacturing apparatuses were used in parallel. In other words, the parallel-period detecting portion 14 removes time periods when a target manufacturing apparatus or another manufacturing apparatuses was used consecutively from the time periods when the manufacturing apparatuses were used.

The yield threshold determining portion 15 detects a manufacturing apparatus having a period of time when the yields are lower than a yield threshold value and the low yield period.

The low-yield identifying portion 16 identifies a manufacturing apparatus having significant differences in yield from the other manufacturing apparatuses in the low yield period as a low-yield-period apparatus, and identifies the low yield period as being a significantly lower yield period. That is, the low-yield identifying portion 16 identifies a low-yield-period apparatus from among the manufacturing apparatuses detected by the yield threshold determining portion 15.

The yield threshold determining portion 15 further includes a good/defective determining portion 19 and a consecutive-fail determining portion 20. By comparing the yield of a group of objects processed by a manufacturing apparatus with the yield threshold value, the good/defective determining portion 19 determines whether the group of processed objects is good or defective. When a plurality of groups of processed objects are determined to be substantially consecutively defective for a certain period, the consecutive-fail determining portion 20 identifies the certain period as a low yield period.

Figure 3:
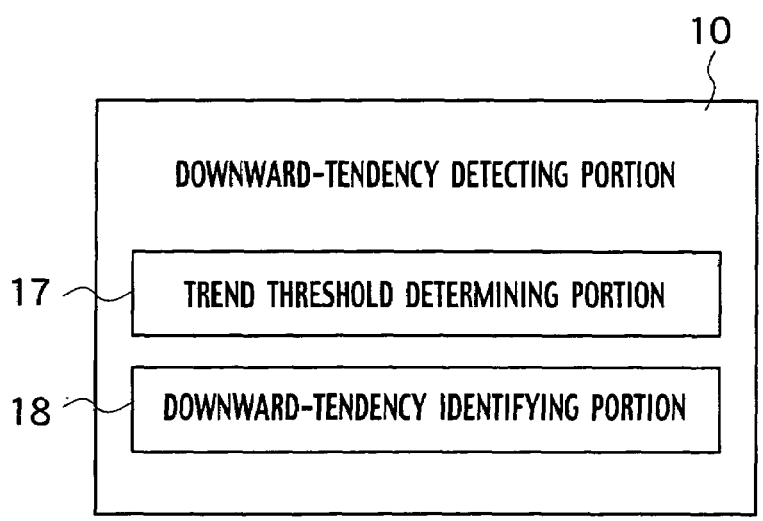
FIG. 3 is a block diagram showing in detail a downward-tendency detecting portion of FIG. 1.

The downward-tendency detecting portion 10 of FIG. 1 includes a trend threshold determining portion 17 and a downward-tendency identifying portion 18, as shown in FIG. 3. The trend threshold determining portion 17 detects a manufacturing apparatus which has a downward tendency in a recent yield trend compared with a yield-trend threshold value. The downward-tendency identifying portion 18 identifies a manufacturing apparatus exhibiting a significant difference in the recent yield trend from the other manufacturing apparatuses as a downward-tendency apparatus. That is, the downward-tendency identifying portion 18 identifies a downward-tendency apparatus from among the manufacturing apparatuses detected by the trend threshold determining portion 17.

Figure 4A:
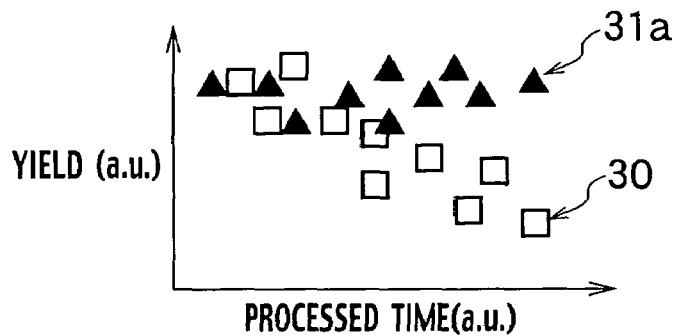
FIG. 4A is a graph showing an example of an apparatus with a downward-tendency that has a significant downward tendency compared with other manufacturing apparatuses.

FIG. 4A is a graph where the yields of lots processed by two manufacturing apparatuses 30 and 31a are plotted according to processed time thereof. The vertical axis represents the yield of a lot and the horizontal axis represents the processed time. The yields of lots processed by the manufacturing apparatus 30 decrease as the processed time advances. That is, the recent yield trend of the manufacturing apparatus 30 is downward. On the other hand, the yields of lots processed by the manufacturing apparatus 31a are almost constant regardless of the processed time. That is, the recent yield trend of the manufacturing apparatus 31a is stable. In this case, with respect to the manufacturing apparatus 30, the trend threshold determining portion 17 determines that the recent yields of the manufacturing apparatus 30 tend downwards compared with the yield-trend threshold value, and selects the manufacturing apparatus 30. Then the downward-tendency identifying portion 18 determines that there is a significant difference in the recent yield trend between the manufacturing apparatuses 30 and 31a, and identifies the manufacturing apparatus 30 as a "downward-tendency apparatus."

Figure 4B:
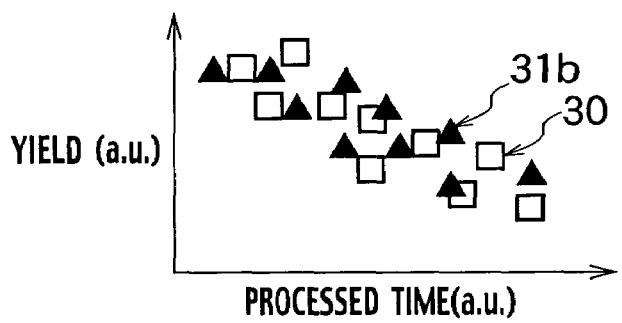
FIG. 4B is a graph showing an example of a manufacturing apparatus that has a downward tendency regarding recent yield, but does not have a significant downward tendency in yield compared with other manufacturing apparatuses.

FIG. 4B is a graph where the yields of lots processed by two manufacturing apparatuses 30 and 31b are plotted according to processed time. The vertical axis represents the yield of a lot and the horizontal axis represents the processed time. The yields of lots processed by the manufacturing apparatuses 30 and 31b both decrease as the processed time advances. That is, the recent yield trends of the manufacturing apparatuses 30 and 31b are downward. In this case, with respect to the manufacturing apparatus 30, the trend threshold determining portion 17 determines that the recent yield trend of the manufacturing apparatus 30 tend downwards compared with the yield-trend threshold value, and selects the manufacturing apparatus 30. However, the downward-tendency identifying portion 18 determines that there is no significant difference in the recent yield trend between the manufacturing apparatuses 30 and 31b, and does not identify the manufacturing apparatus 30 as a "downward-tendency apparatus."

Figure 5:
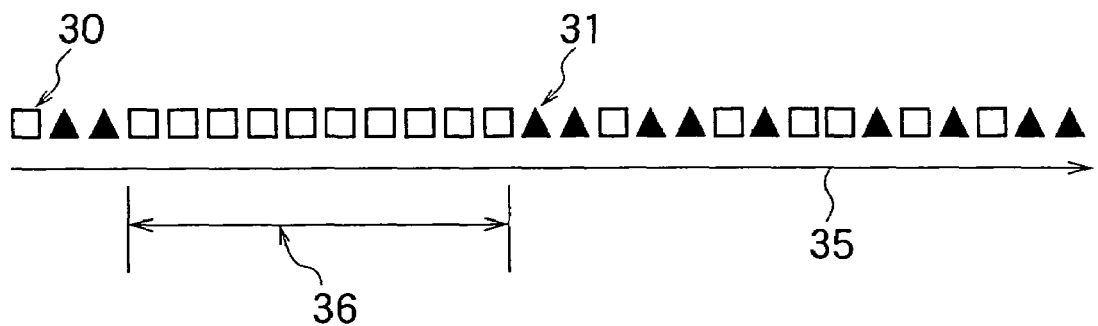
FIG. 5 is a view showing an example of a period when a plurality of manufacturing apparatuses were used in parallel and a period when a target manufacturing apparatus or another manufacturing apparatus was consecutively used.

FIG. 5 is a view where lots processed by two manufacturing apparatuses 30 and 31 used in a specific manufacturing process are arranged according to a processed time 35. The parallel-period detecting portion 14 arranges lots processed by the manufacturing apparatuses 30 and 31 according to the processed time 35 and identifies time periods when the manufacturing apparatuses 30 and 31 were used with appropriate frequencies. In other words, the parallel-period detecting portion 14 removes a consecutive-use period 36 when the manufacturing apparatus 30 or 31 was used in an unusual consecutive manner, from the entire time period of the processed time 35 when the manufacturing apparatuses 30 and 31 were used. Therefore, the remaining time period of the entire time period of the processed time 35 from which the consecutive-use period 36 is removed corresponds to time periods when the manufacturing apparatuses 30 and 31 were used with appropriate frequencies, that is, when the manufacturing apparatuses 30 and 31 were used in parallel.

FIG. 6 is a graph where the yields of lots processed by a specific manufacturing apparatus are plotted according to a processed time, by using the yield data stored in the yield data storing portion 2 of FIG. 1. The yields of lots are indicated by rhombus-shaped marks in FIG. 6. With respect to the distribution of yields shown in FIG. 6, the good/defective determining portion 19 determines, for each lot, whether it is good or defective by comparing the yield of each lot with a yield threshold value 37. That is, the good/defective determining portion 19 determines that lots having higher yields than the yield threshold value 37 are "good," and that lots having lower yields than the yield threshold value 37 are "defective." A lot determined as "good" is marked with a square mark at the position of 95% yield at the processed time of the lot in the graph, and a lot determined as "defective" is marked with a square mark at the position of 60% yield at the processed time of the lot.

The consecutive-fail determining portion 20 identifies a certain period during which a plurality of lots are determined as substantially consecutively defective, as a "low yield period." Specifically, according to a decision by the majority of determination results for a specific lot and for several lots preceding and following the specific lot in the time order, it is determined whether or not the specific lot belongs to a low-yield side. That is, when there is a period of processed time during which some lots belonging to the low-yield side are successive to a certain degree, the period of processed time of these lots is identified as a low yield period. When the number of lots successively belonging to the low-yield side is not more than a specified number, the period of processed time is identified as noise and excluded from the low-yield period. The results of the decision by the majority are indicated by bold dashed lines in FIG. 6. In this way, the yield threshold determining portion 15 detects manufacturing apparatuses having a low yield period as compared with the yield threshold value 37, and the low yield periods.

Furthermore, when a low yield period exists, the trend threshold determining portion 17 determines whether the yield trend of lots processed immediately before the low yield period is downward compared with the yield-trend threshold value. When it is determined that the yield trend of the lots processed immediately before the low yield period is downward, the consecutive-fail determining portion 20 identifies the abovementioned low yield period plus a period when the yield trend is downward as a new low yield period.

FIG. 7 shows an example of the yield distributions of manufacturing apparatus 30a to which the warning issuing portion 11 of FIG. 1 issues a warning of "level 1" and manufacturing apparatus 32a to be compared to the manufacturing apparatus 30a. The yields of lots processed by the manufacturing apparatus 32a are almost constant regardless of the processed time and higher than the yield threshold value. That is, the manufacturing apparatus 32a is neither a low-yield-period apparatus nor a downward-tendency apparatus. On the other hand, the yields of lots processed by the manufacturing apparatus 30a are lower than the yield threshold value after a specific period of processed time, and subsequently decrease as the processed time advances. The manufacturing apparatus 30a has a significantly lower yield period compared with the manufacturing apparatus 32a and is exhibiting a significant downward tendency in yield compared with the manufacturing apparatus 32a. In other words, the low-yield detecting portion 9 detects the manufacturing apparatus 30a as a low-yield-period apparatus, and at the same time, the downward-tendency detecting portion 10 detects the manufacturing apparatus 30a as a downward-tendency apparatus. Accordingly, the warning issuing portion 11 issues a warning of "level 1" to the manufacturing apparatus 30a. In this way, a manufacturing apparatus to which a warning of "level 1" is issued is defined as one having a significantly lower yield period, which is continuing, as compared with other manufacturing apparatuses, and having a downward tendency in the recent yield.

FIG. 8 shows an example of the yield distributions of manufacturing apparatus 30b to which the warning issuing portion 11 of FIG. 1 issues a warning of "level 2" and manufacturing apparatus 32b to be compared to the manufacturing apparatus 30b. The yields of lots processed by the manufacturing apparatus 32b are almost constant regardless of the processed time and higher than the yield threshold value. That is, the manufacturing apparatus 32a is neither a low-yield-period apparatus nor a downward-tendency apparatus. On the other hand, the yields of lots processed by the manufacturing apparatus 30b are lower than the yield threshold value after a specific period of processed time, and now kept low. The manufacturing apparatus 30b has a significantly lower yield period compared with the manufacturing apparatus 32b. The significantly lower yield period is continuing, but the manufacturing apparatus 30b does not have a significant downward tendency in yield compared with the manufacturing apparatus 32b. In other words, the low-yield detecting portion 9 detects the manufacturing apparatus 30b as a low-yield-period apparatus, but the downward-tendency detecting portion 10 does not detect the manufacturing apparatus 30b as a downward-tendency apparatus. Accordingly, the warning issuing portion 11 issues a warning of "level 2" to the manufacturing apparatus 30b. In this way, a manufacturing apparatus to which a warning of "level 2" is issued is defined as one having a significantly lower yield period compared with other manufacturing apparatuses, the significantly lower yield period still continuing.

Figure 9A:
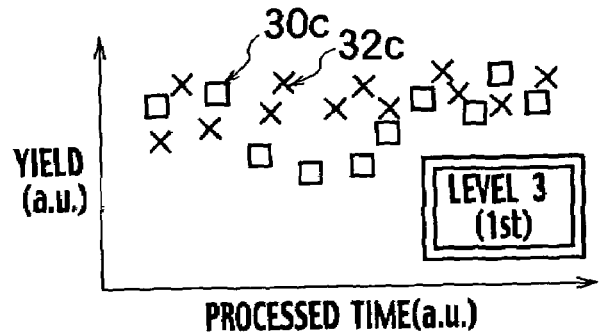
FIG. 9A is a graph showing an example of the yield distribution of a manufacturing apparatus to which the warning issuing portion of FIG. 1 issues a warning of "level 3;"

FIG. 9A shows an example of the yield distributions of manufacturing apparatus 30c to which the warning issuing portion 11 of FIG. 1 issues a warning of "level 3" and manufacturing apparatus 32c to be compared to the manufacturing apparatus 30c. The yields of lots processed by the manufacturing apparatus 32c are almost constant regardless of the processed time and higher than the yield threshold value. That is, the manufacturing apparatus 32c is neither a low-yield-period apparatus nor a downward-tendency apparatus. On the other hand, the yields of lots processed by the manufacturing apparatus 30c are lower than the yield threshold value for a specific period of processed time, but are currently higher than the yield threshold value. The manufacturing apparatus 30c has a significantly lower yield period as compared with the manufacturing apparatus 32c and has recovered from the significantly lower yields so as to have no significant downward tendency in yield compared with the manufacturing apparatus 32c. In other words, the low-yield detecting portion 9 detects the manufacturing apparatus 30c as a low-yield-period apparatus, but the downward-tendency detecting portion 10 does not detect the manufacturing apparatus 30c as a downward-tendency apparatus. Accordingly, the warning issuing portion 11 issues a warning of "level 3" to the manufacturing apparatus 30c.

Figure 9B:
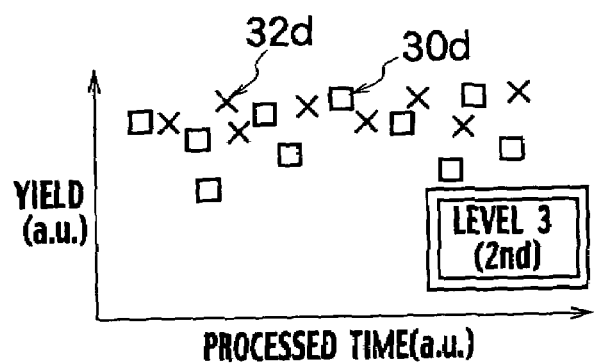
FIG. 9B is a graph showing another example of the yield distribution of a manufacturing apparatus to which the warning issuing portion of FIG. 1 issues a warning of "level 3;"

FIG. 9B shows another example of the yield distributions of a manufacturing apparatus 30d to which the warning issuing portion 11 of FIG. 1 issues a warning of "level 3" and manufacturing apparatus 32d to be compared to the manufacturing apparatus 30d. The yields of lots processed by the manufacturing apparatus 32d are almost constant regardless of the processed time and higher than the yield threshold value. That is, the manufacturing apparatus 32d is neither a low-yield-period apparatus nor a downward-tendency apparatus. On the other hand, the yields of lots processed by the manufacturing apparatus 30d were higher than the yield threshold value in the past and are currently maintained higher. The manufacturing apparatus 30d has a significant difference in yield from the manufacturing apparatus 32d, but does not have a significantly lower yield period as compared with the manufacturing apparatus 32d and is not exhibiting significant downward tendency in yield compared with the manufacturing apparatus 32d. In other words, the low-yield detecting portion 9 does not detect the manufacturing apparatus 30d as a low-yield-period apparatus, and the downward-tendency detecting portion 10 does not detect the manufacturing apparatus 30d as a downward-tendency apparatus. Accordingly, the warning issuing portion 11 issues a warning of "level 3" to the manufacturing apparatus 30*d*.

In this way, the manufacturing apparatuses to which the warnings of "level 3" are issued do not have significantly lower yield periods compared with the manufacturing apparatuses 32*c* and 32*d*, or have already recovered in yield even if the manufacturing apparatuses have significantly lower yield periods. The manufacturing apparatuses are defined as one having no significant downward tendency in yield compared with the manufacturing apparatuses 32*c* and 32*d*.

Figure 10:
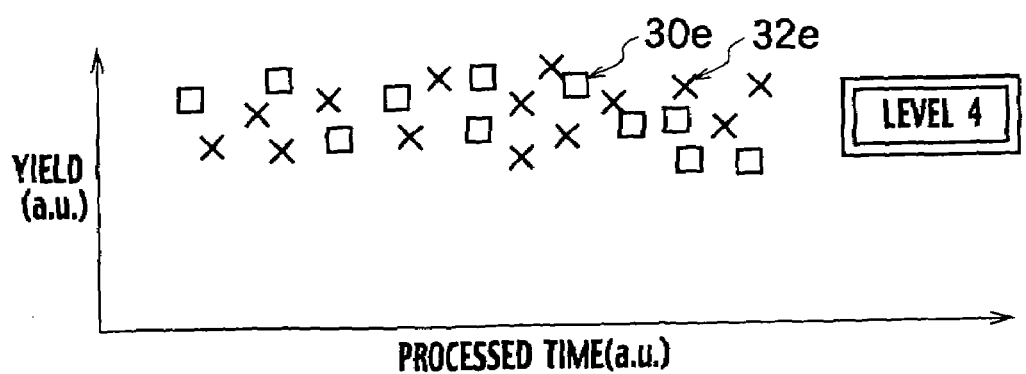
FIG. 10 is a graph showing an example of the yield distribution of a manufacturing apparatus to which the warning issuing portion of FIG. 1 issues a warning of "level 4;"

FIG. 10 shows an example of the yield distributions of manufacturing apparatus 30*e* to which the warning issuing portion 11 of FIG. 1 issues a warning of "level 4" and manufacturing apparatus 32*e* to be compared to the manufacturing apparatus 30*e*. The yields of lots processed by the manufacturing apparatus 32*e* are almost constant regardless of the processed time and higher than the yield threshold value. That is, the manufacturing apparatus 32*e* is neither a low-yield-period apparatus nor a downward-tendency apparatus. On the other hand, the yields of lots processed by the manufacturing apparatus 30*e* were higher than the yield threshold value in the past and currently decrease as the processed time advances. The manufacturing apparatus 30*e* does not have a significantly lower yield period as compared with the manufacturing apparatus 32*e*, but has a significant downward tendency in yield compared with the manufacturing apparatus 32*e*. In other words, the low-yield detecting portion 9 does not detect the manufacturing apparatus 30*e* as a low-yield-period apparatus, but the downward-tendency detecting portion 10 detects the manufacturing apparatus 30*c* as a downward-tendency apparatus. Accordingly, the warning issuing portion 11 issues a warning of "level 4" to the manufacturing apparatus 30*e*. In this way, a manufacturing apparatus to which a warning of "level 4" is issued is defined as one having no significantly lower yield period compared with other manufacturing apparatuses and currently having a significant downward tendency in yield compared with the other manufacturing apparatuses.

<Method of Detecting Failure>

Figure 11:
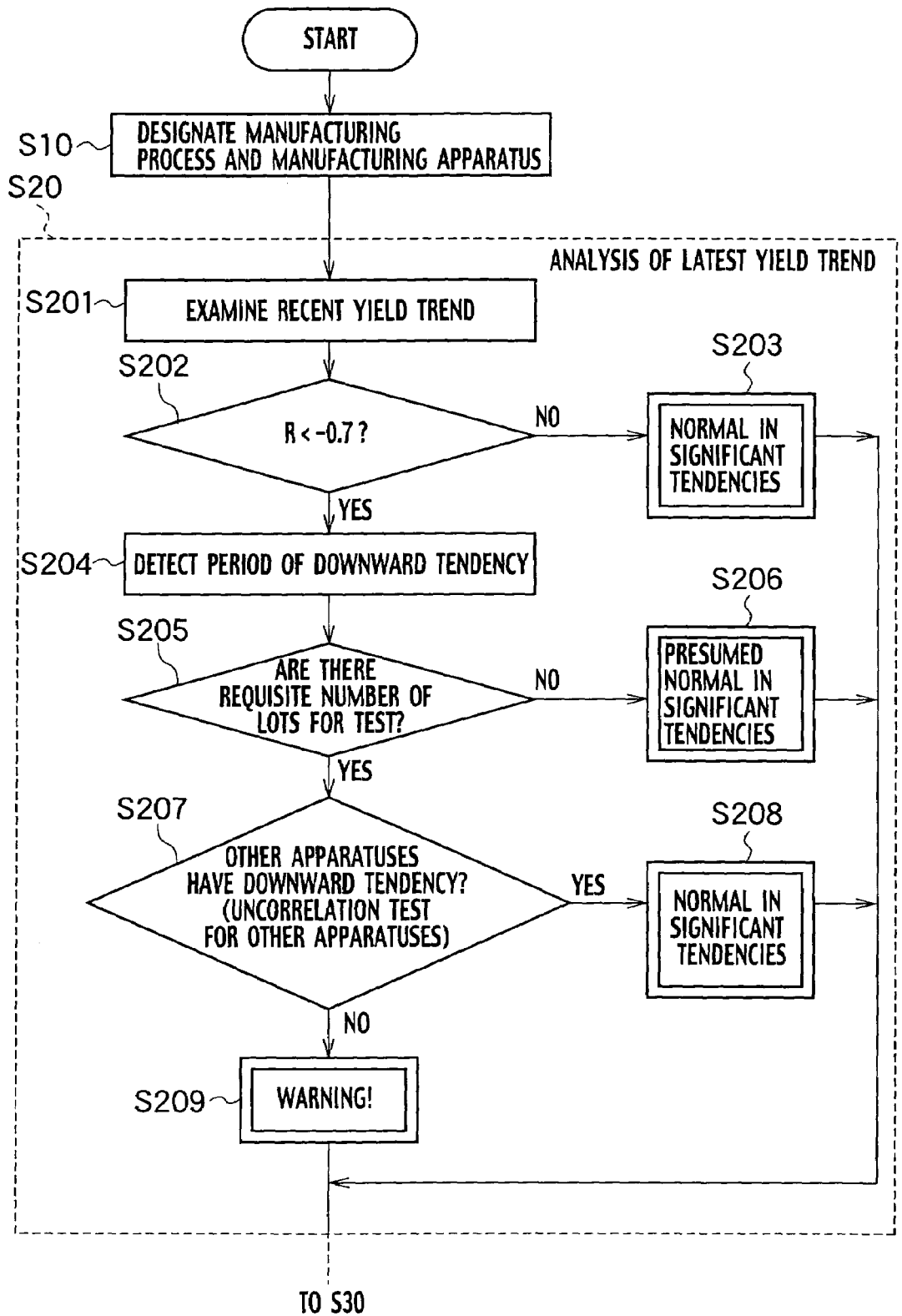
FIG. 11 is a flow chart showing part of a method of detecting failure of manufacturing apparatuses by using the system for detecting failure of FIG. 1.
Figure 12:
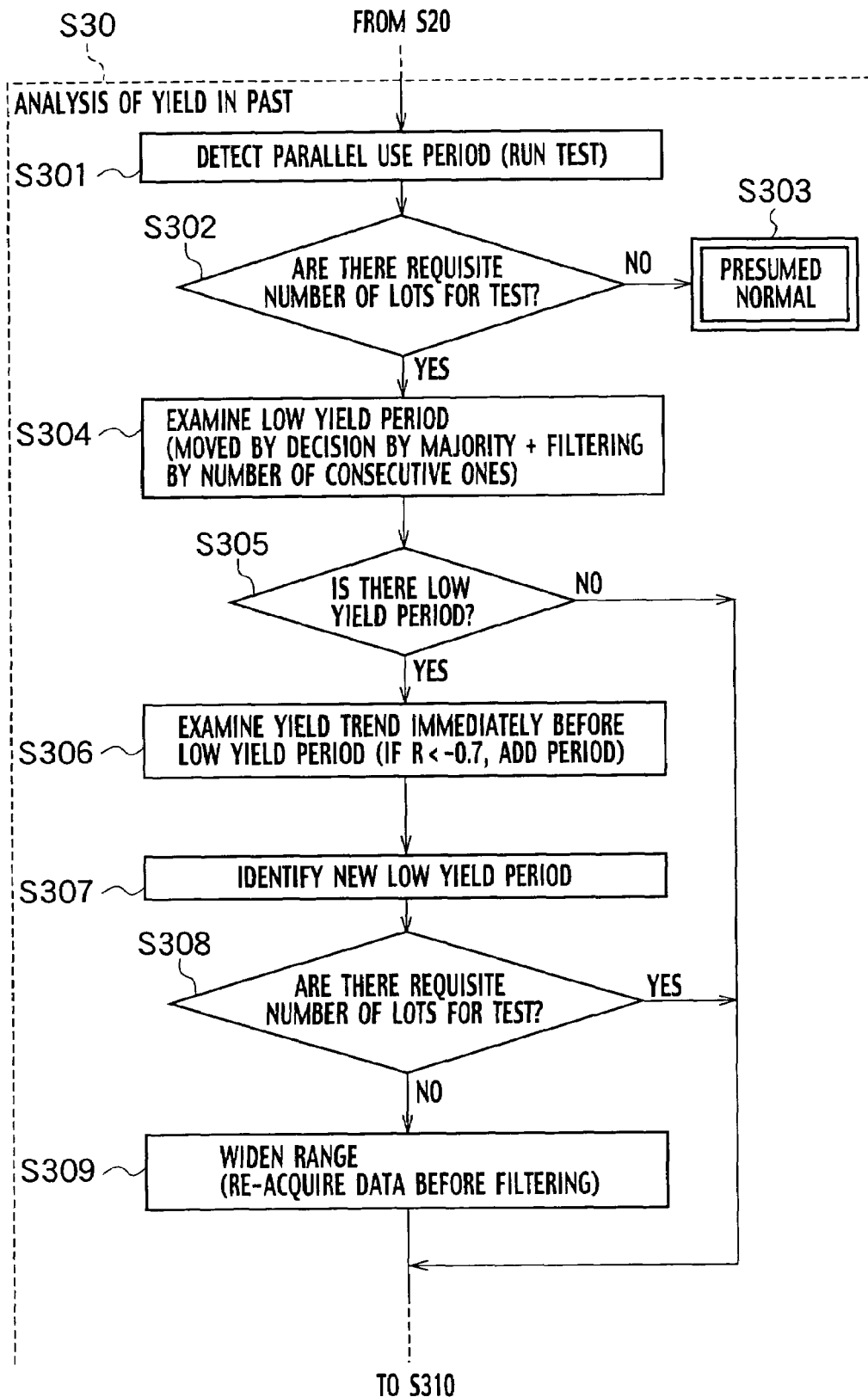
FIG. 12 is a flow chart showing part following the part in FIG. 11 of a method of detecting failure of manufacturing apparatuses by using the system for detecting failure of FIG. 1.
Figure 13:
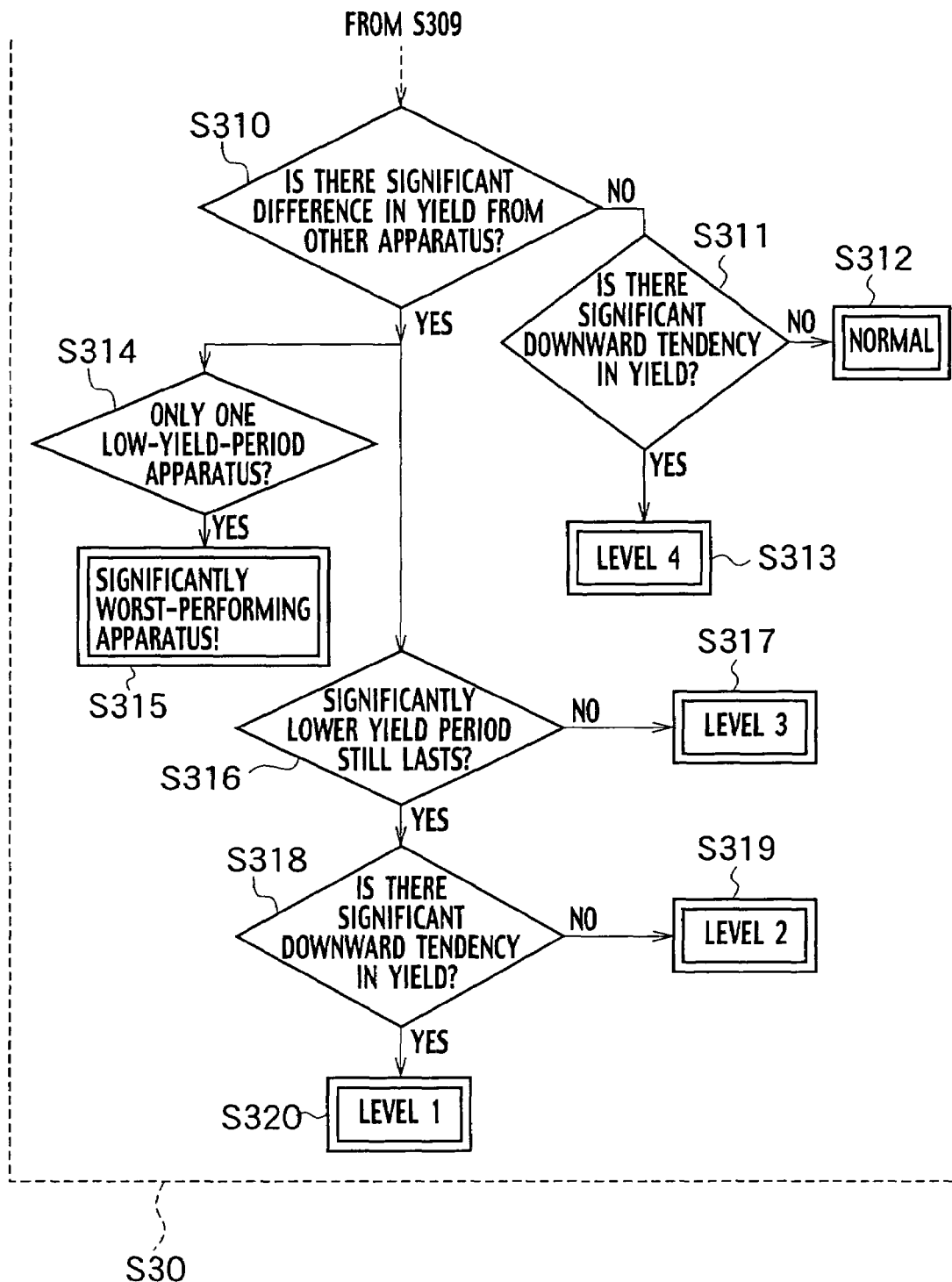
FIG. 13 is a flow chart showing part following the part in FIG. 12 of a method of detecting failure of manufacturing apparatuses by using the system for detecting failure of FIG. 1.

Next, with reference to FIGS. 11 to 13, a method of detecting failure of manufacturing apparatuses by using the system for detecting failure shown in FIG. 1 will be described. The method of detecting failure of manufacturing apparatuses includes a stage of designating a manufacturing process and a manufacturing apparatus (S10), a stage of analyzing a recent yield trend (S20), and a stage of analyzing yields in the past and issuing a warning (S30). The stage of designating a manufacturing process and a manufacturing apparatus (S10) and the stage of analyzing a recent yield trend (S20) are shown in FIG. 11, and the stage of analyzing yields in the past and issuing a warning (S30) is shown in FIGS. 12 and 13.

(a) First, in Stage S10, when an operator designates a manufacturing process (target manufacturing process) and a manufacturing apparatus (target manufacturing apparatus) to be monitored to detect failure, the computing portion 1 reads in data of yields, for each period when the target manufacturing apparatus was used, of the target manufacturing process, the target manufacturing apparatus, and the other manufacturing apparatuses used in the target manufacturing process from the yield data storing portion 2.

(b) The stage of analyzing a recent yield trend (S20) including the following Stages S201 to S209 is carried out. First, in Stage S201, the trend threshold determining portion 17 examines the correlation between the yields of the latest several lots processed by the target manufacturing apparatus and the processed time. Specifically, the trend threshold determining portion 17 sets a yield-trend threshold value R (e.g., R=−0.7) beforehand, and examines the yield trend (yield increase rate) of the latest several lots with respect to the yield-trend threshold value R as a reference. When the yield increase rate of the latest several lots is greater than the yield-trend threshold value, that is, when a positive correlation exists between the yields of the latest several lots and the processed time (NO in Stage S202), in Stage S203 the trend threshold determining portion 17 determines that the target apparatus is "normal in the significant tendencies."

(c) When the yield increase rate is less than the yield-trend threshold value, that is, when a negative correlation exists between the yields of the latest several lots and the processed time (YES in Stage S202), the process proceeds to Stage S204. In Stage S204 the trend threshold determining portion 17 detects a time period during which the target apparatus has a downward tendency in yield. If yield data of a requisite number of lots to examine the target apparatus does not exist (NO in Stage S205), the target apparatus is withdrawn from the examination, and in Stage S206 the trend threshold determining portion 17 determines that the target apparatus is "presumed normal in the significant tendencies." If yield data of a requisite number of lots to examine the target apparatus exists (YES in Stage S205), the process proceeds to Stage S207.

(d) In Stage S207, the downward-tendency identifying portion 18 examines the correlation between the yields of lots processed by other manufacturing apparatuses during the time period when the target apparatus has the downward tendency in yield and the processed time. When a negative correlation is seen with respect to the other manufacturing apparatuses as well (YES in Stage S207), in Stage S208, the downward-tendency identifying portion 18 determines that the target apparatus is "normal in the significant tendencies." For example, as shown in FIG. 4B, when a negative correlation is seen with respect to lots processed by another manufacturing apparatus 31*b* as well as with lots processed by a target apparatus 30, another cause of failure that is not attributable to the manufacturing apparatuses is expected to exist, and thus the target apparatus 30 is not considered to be failing.

(e) When a negative correlation is not seen with respect to the other manufacturing apparatuses (NO in Stage S207), the process proceeds to Stage S209. In Stage S209 the downward-tendency identifying portion 18 presumes that only the target apparatus has a downward tendency in yield and identifies the target apparatus as a downward-tendency apparatus having a significant difference in the recent yield trend from the other manufacturing apparatuses. For example, as shown in FIG. 4A, while the other manufacturing apparatus 31*a* has no variation in yield over time, the target apparatus 30 exhibits a negative correlation between the yields and the processed time. In this case, the target apparatus 30 can be considered to be failing.

In this way, in Stage S20, by comparing the recent yield trends of a plurality of the manufacturing apparatuses, the downward-tendency detecting portion 10 detects the target apparatus which has a significant downward tendency in yield compared with the other manufacturing apparatuses, as a "downward-tendency apparatus."

Subsequently, the stage of analyzing yields in the past and issuing a warning (S30) including stages S301 to S320, shown in FIGS. 12 and 13, is carried out.

(A) First, in Stage S301, the parallel-period detecting portion 14 removes a period during which the target manufacturing apparatus or another manufacturing apparatus was consecutively used from the time period when the manufacturing apparatuses were used. Specifically, as shown in FIG. 5, all lots are marked as a lot processed by the target manufacturing apparatus 30 or a lot processed by another manufacturing apparatus 31 in the target process, and arranged in time order to search for consecutiveness. If the consecutive-use period 36 exists during which lots were processed by the target apparatus 30 or the other manufacturing apparatus 31 in an unusual consecutive manner, a yield variation due to another cause of failure that is not attributable to the manufacturing apparatuses may occur during the consecutive-use period 36 and cause a false report. Therefore, the consecutive-use period 36 is removed from the processed time 35 so as only to extract yield data during time periods when the target manufacturing apparatus 30 and the other manufacturing apparatus are appropriately mixed and used in terms of time order. In this way, the parallel-period detecting portion 14 extracts periods when a plurality of the manufacturing apparatuses are used in parallel.

(B) When the yield data of the requisite number of lots to examine the target apparatus does not exist (NO in Stage S302), the target apparatus is withdrawn from the examination, and in Stage S303, the yield threshold determining portion 15 determines that the target apparatus is "presumed normal." When the yield data of the requisite number of lots to examine the target apparatus exists (YES in Stage S302), the process proceeds to Stage S304.

(C) In Stage S304, the yield threshold determining portion 15 examines whether or not a group of lots processed by the target apparatus have an obviously low yield period. For example, for the yield distribution shown in FIG. 6, the good/defective determining portion 19 determines whether each lot is good or defective by comparing the yield of each lot with the yield threshold value 37. When a plurality of lots are determined as substantially consecutively defective for a certain period, the consecutive-fail determining portion 20 identifies the certain period as a "low yield period." When no low yield period exists (NO in Stage S305), the process proceeds to Stage S310. When a low yield period exists (YES in Stage S305), the process proceeds to Stage S306.

(D) In Stage S306, the trend threshold determining portion 17 determines whether or not lots processed immediately before the low yield period has a downward tendency in yield compared with the yield-trend threshold value. When the lots immediately before tend downwards, in Stage S307, the consecutive-fail determining portion 20 identifies the above-mentioned low yield period plus a period during which the lots have the downward tendencies as a new low yield period. By extracting the "low yield period," not only the detection sensitivity of an examination can be enhanced, but also a time period when a failure occurs can be efficiently examined.

(E) When the yield data of the requisite number of lots for examining the target apparatus exists (YES in Stage S308), the process proceeds to Stage S310. When the yield data of the requisite number of lots to examine the target apparatus does not exist (NO in Stage S308), the yield data before extracting the low yield period is acquired again in Stage S309.

(F) In Stage S310, the low-yield identifying portion 16 determines whether or not the target apparatus has a significant difference in yield from the other manufacturing apparatuses during the low yield period. Stage S310 is consists of the Kruskal-Wallis test. When the target apparatus has no significant difference in yield from the other manufacturing apparatuses (NO in Stage S310), the process proceeds to Stage S311. In Stage S311, the downward-tendency detecting portion 10 determines whether or not the target apparatus has a significant downward tendency in yield compared with the other manufacturing apparatuses. Stage S311 is the Scheffe pair-wise comparison. When the target apparatus has a significant downward tendency in yield (YES in Stage S311), the warning issuing portion 11 issues a warning of "level 4" to the target apparatus. When the target apparatus has no significant downward tendency in yield (NO in Stage S311), the computing portion 1 identifies the target apparatus as "normal" in stage 312.

(G) When the target apparatus has a significant difference in yield from the other manufacturing apparatuses (YES in stage 310), the process proceeds to Stage S314 and Stage S316. In Stage S314, the low-yield identifying portion 16 identifies the target apparatus as a low-yield-period apparatus, and determines whether or not only the target apparatus is a low-yield-period apparatus during the significantly lower yield period. When only the target apparatus is a low-yield-period apparatus, the warning issuing portion 11 issues a warning of "significantly worst-performing apparatus!" to the target apparatus in Stage S315.

(H) In Stage S316, the low-yield detecting portion 9 determines whether or not the significantly lower yield period of the target apparatus is continuing. When the significantly lower yield period does not exist, or no longer exists because the target apparatus has recovered from the significantly lower yield period (NO in Stage S316), the warning issuing portion 11 issues a warning of "level 3" to the target apparatus in Stage S317. When the significantly lower yield period is still continuing (YES in Stage S316), the process proceeds to Stage S318.

(I) In Stage S318, the downward-tendency detecting portion 10 determines whether or not the target apparatus has a significant downward tendency in yield compared with the other manufacturing apparatuses. When the target apparatus has a significant downward tendency in yield (YES in Stage S318), the warning issuing portion 11 issues a warning of "level 1" to the target apparatus in Stage S320. When the target apparatus has no significant downward tendency in yield (NO in Stage S318), the warning issuing portion 11 issues a warning of "level 2" to the target apparatus in Stage S319.

In this way, the low-yield detecting portion 9 identifies a low-yield-period apparatus having a significantly lower yield period compared with the other manufacturing apparatuses and the significantly lower yield period by comparing the yields of a plurality of manufacturing apparatuses used in parallel in a specific manufacturing process for each time period when the manufacturing apparatuses were used.

FIG. 14 is a table showing an example of results of performing the method of detecting failure shown in FIGS. 11 to 13. "Parameter" indicates parameters of the yield data stored in the yield data storing portion 2. That is, parameters, "all-bit good product rate," "die-sorter (D/S) yield," "DC-yield," "function yield," "all-bit good/defective products ratio," and "D/S defective product rate" are included in the concept of the good product rate of finished products having experienced a series of manufacturing processes including a specific manufacturing process or the good product rate in the specific manufacturing process. When there was no significantly lower yield period in the past, "none" is displayed. When there was a significantly lower yield period in the past but it has recovered, "recovered" is displayed. When there was a significantly lower yield period in the past and it is continuing now, "continued!" is displayed. Note that as shown in, for example, paragraph No. 0063 to 0243 of U.S. patent application Publication No. US2003/0011376A1, the contents of which are incorporated herein by reference, a characteristic quantity representing in number the distribution of defectives in the wafer surface of a semiconductor wafer which is a processed object and a characteristic quantity representing in number the distribution of the yields in a lot can be used as other parameters of the yield data.

As shown in FIG. 15A, the output unit 8 of FIG. 1 can display individual results of failure detected in a specific manufacturing apparatus. Furthermore, as shown in FIG. 15B, the output unit 8 can display the distribution of yields of a specific manufacturing apparatus stored in the yield data storing portion 2 of FIG. 1, and as shown in FIG. 15C, the output unit 8 can selectively display a significantly lower yield period out of the distribution of yields of a specific manufacturing apparatus.

As described above, a period during which a plurality of manufacturing apparatuses are used in a specific manufacturing process and a low yield period are automatically extracted. It is examined whether or not a target apparatus is different in yield from the other manufacturing apparatuses during the low yield period and whether or not lots recently processed by the target apparatus have downward tendencies in yield. If a failure is found, the warning of a level corresponding to the situation is issued. In the related art, manufacturing apparatuses are prioritized and a failing apparatus is detected only based on statistical values of the yield data of all lots and differences in yield without paying much attention to variations over time. However, according to the embodiment of the present invention, by appropriately extracting yield data while taking account of the time axis to understand the situation, detection sensitivity can be enhanced, and the false reporting rate can be reduced. Furthermore, countermeasures can be quickly prioritized in terms of effectiveness.

<Computer Program Product for Detecting Failure>

The method of detecting failure of manufacturing apparatuses mentioned above is expressed in time-series processes, operations, or procedures that are executable in a computer system. Therefore, the method of detecting failure of manufacturing apparatuses can be controlled by a computer program that specifies functions achieved by, for example, a processor in a computer system. The computer program may be stored in a computer program product. The computer program is read from the computer program product by a computer system and is executed thereby, to control the computer system and carry out the method of detecting failure of manufacturing apparatuses. The computer program product may be used as the program storing portion 5 shown in FIG. 1. Alternatively, the computer program may be read and stored in the program storing portion 5 to control processes carried out by the computing portion 1. The computer program product may be implemented by a memory unit, a magnetic disk drive, an optical disk drive, or any other device capable of storing the computer program.

As described above, according to the embodiment of the present invention, it is possible to provide a system for detecting failure of manufacturing apparatuses, a method of detecting failure of manufacturing apparatuses, and a computer program for detecting failure of manufacturing apparatuses, which can enhance the detection sensitivity and reduce false reports in number.

OTHER EMBODIMENTS

As mentioned above, the present invention has been described through an embodiment, however, the descriptions and drawings that constitute a portion of this disclosure should not be perceived as those limiting the present invention. Various alternative embodiments and operational techniques will become clear to persons skilled in the art from this disclosure.

In the embodiment of the present invention, a description has been made with respect to semiconductor manufacturing apparatuses used in a process of manufacturing semiconductor devices as an example of manufacturing apparatuses according to the present invention. However, manufacturing apparatuses according to the present invention are not limited to these. As long as they are a plurality of manufacturing apparatuses used in parallel in a specific manufacturing process, the invention is applicable to manufacturing apparatuses used not only in the process of manufacturing semiconductor devices, but also in a process of manufacturing other products.

Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for detecting failure of manufacturing apparatuses, comprising:
    a low-yield detecting portion which identifies a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used;
    a downward-tendency detecting portion which identifies a downward-tendency apparatus having a significant downward tendency in yield compared with the other manufacturing apparatus by comparing recent yield trends of the plurality of manufacturing apparatuses;
    a warning issuing portion which issues multi-level warnings to the low-yield-period apparatus and the downward-tendency apparatus; and
    a yield data storing portion which stores yield data of the plurality of manufacturing apparatuses for each time period when the manufacturing apparatuses were used,
    wherein the yield data includes at least one of a good product rate of finished products having experienced a series of manufacturing processes including the specific manufacturing process, a good product rate in the specific manufacturing process, a characteristic numerical quantity representing a distribution of defectives in a wafer surface of a semiconductor wafer processed by one of the manufacturing apparatuses as a processed object, and a characteristic numerical quantity representing a distribution of yields in one lot of a group of objects processed by one of the manufacturing apparatuses.

2. The system of claim 1, wherein the low-yield detecting portion comprises:
    a parallel-period detecting portion which detects a time period when the plurality of manufacturing apparatuses were used in parallel;

a yield threshold determining portion which detects one of the manufacturing apparatuses having a low yield period when yields are lower than a yield threshold value and the low yield period; and a low-yield identifying portion which identifies one of the manufacturing apparatuses having a significant difference in yield from the other manufacturing apparatus during the low yield period as the low-yield-period apparatus, and identifies the low yield period as being the significantly lower yield period.

3. The system of claim 2, wherein the yield threshold determining portion comprises:

a good/defective determining portion which determines whether a group of processed objects is good or defective by comparing a yield of a group of objects processed by one of the manufacturing apparatuses with the yield threshold value; and a consecutive-fail determining portion which identifies a certain period as being the low yield period when a plurality of groups of the processed objects are determined to be substantially consecutively defective for the certain period.

4. The system of claim 2, wherein the low-yield identifying portion determines whether or not only one of the manufacturing apparatuses is a low-yield-period apparatus during the significantly lower yield period.

5. The system of claim 1, wherein the downward-tendency detecting portion comprises:

a trend threshold determining portion which detects one of the manufacturing apparatuses which has a downward tendency in recent yield trend compared with a yield-trend threshold value; and a downward-tendency identifying portion which identifies one of the manufacturing apparatuses which has a significant difference in recent yield trend from the other manufacturing apparatus as the downward-tendency apparatus.

6. The system of claim 1, wherein the warning issuing portion issues the warnings of levels depending on whether or not the significantly lower yield period of the low-yield-period apparatus is currently continuing, and whether or not the low-yield-period apparatus has a significant downward tendency in yield compared with the other manufacturing apparatus.

7. The system of claim 1, wherein the low-yield detecting portion goes back to past to compare the yields by use of the yield data stored in the yield data storing portion.

8. A system for detecting failure of manufacturing apparatuses, comprising:

a low-yield detecting portion which identifies a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used;

a downward-tendency detecting portion which identifies a downward-tendency apparatus having a significant downward tendency in yield compared with the other manufacturing apparatus by comparing recent yield trends of the plurality of manufacturing apparatuses:

a warning issuing portion which issues multi-level warnings to the low-yield-period apparatus and the downward-tendency apparatus;

a yield data storing portion which stores yield data of the plurality of manufacturing apparatuses for each time period when the manufacturing apparatuses were used;

an event/operation condition examining portion which examines whether or not maintenance, inspection, repair or component replacement was performed on the low-yield-period apparatus and whether or not operating conditions for the low-yield-period apparatus have been changed before and after the significantly lower yield period identified by the low-yield detecting portion;

a cause estimating portion which estimates a cause of low yield in the low-yield-period apparatus based on results of the examining; and an event/operation condition storing portion which stores history of maintenance, inspection, repair and component replacement performed on the manufacturing apparatuses and history of changes of operating conditions for the manufacturing apparatuses.

9. A method of detecting failure of manufacturing apparatuses comprising:

identifying a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used;

identifying a downward-tendency apparatus having a significant downward tendency in yield compared with the other manufacturing apparatus by comparing recent yield trends of the plurality of manufacturing apparatuses; and issuing multi-level warnings to the low-yield-period apparatus and the downward-tendency apparatus, wherein the yield includes at least one of a good product rate of finished products having experienced a series of manufacturing processes including the specific manufacturing process, a good product rate in the specific manufacturing process, a characteristic numerical quantity representing a distribution of defectives in a wafer surface of a semiconductor wafer processed by one of the manufacturing apparatuses as a processed object, and a characteristic numerical quantity representing a distribution of yields in one lot of a group of objects processed by one of the manufacturing apparatuses.

10. The method of claim 9, wherein identifying the low-yield-period apparatus and the significantly lower yield period comprises:

detecting a time period when the plurality of manufacturing apparatuses were used in parallel;

detecting one of the manufacturing apparatuses having a low yield period when yields are lower than a yield threshold value and the low yield period; and identifying one of the manufacturing apparatuses having a significant difference in yield from the other manufacturing apparatus during the low yield period as the low-yield-period apparatus, and identifying the low yield period as being the significantly lower yield period.

11. The method of claim 10, wherein detecting one of the manufacturing apparatuses having a low yield period when yields are lower than a yield threshold value and the low yield period comprises:

determining whether a group of processed objects is good or defective by comparing a yield of a group of objects processed by one of the manufacturing apparatuses with the yield threshold value; and identifying a certain period as being the low yield period when a plurality of groups of the processed objects are determined to be substantially consecutively defective for the certain period.

12. The method of claim 9, wherein identifying the downward-tendency apparatus comprises:

detecting one of the manufacturing apparatuses which has a downward tendency in recent yield trend compared with a yield-trend threshold value; and identifying one of the manufacturing apparatuses which has a significant difference in recent yield trend from the other manufacturing apparatus as the downward-tendency apparatus.

13. The method of claim 9, wherein the warnings are issued in levels depending on whether or not the significantly lower yield period of the low-yield-period apparatus is currently continuing, and whether or not the low-yield-period apparatus has a significant downward tendency in yield compared with the other manufacturing apparatus.

14. The method of claim 9, wherein identifying the low-yield-period apparatus comprises going back to past to compare the yields by use of past yield data.

15. A method of detecting failure of manufacturing apparatuses, comprising:

identifying a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used;

identifying a downward-tendency apparatus having a significant downward tendency in yield compared with the other manufacturing apparatus by comparing recent yield trends of the plurality of manufacturing apparatuses;

issuing multi-level warnings to the low-yield-period apparatus and the downward-tendency apparatus;

examining whether or not maintenance, inspection, repair or component replacement was performed on the low-yield-period apparatus and whether or not operating conditions for the low-yield-period apparatus have been changed before and after the significantly lower yield period identified by the low-yield detecting portion; and estimating a cause of low yield in the low-yield-period apparatus based on results of the examining.

16. A computer-readable medium including computer program product for detecting failure of manufacturing apparatuses comprising:

an instruction configured to identify a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used;

an instruction configured to identify a downward-tendency apparatus having a significant downward tendency in yield compared with the other manufacturing apparatus by comparing recent yield trends of the plurality of manufacturing apparatuses; and an instruction configured to issue multi-level warnings to the low-yield-period apparatus and the downward-tendency apparatus, wherein the yield includes at least one of a good product rate of finished products having experienced a series of manufacturing processes including the specific manufacturing process, a good product rate in the specific manufacturing process, a characteristic numerical quantity representing a distribution of defectives in a wafer surface of a semiconductor wafer processed by one of the manufacturing apparatuses as a processed object, and a characteristic numerical quantity representing a distribution of yields in one lot of a group of objects processed by one of the manufacturing apparatuses.

17. The computer-readable medium including computer program product of claim 16, wherein the instruction configured to identify the low-yield-period apparatus and the significantly lower yield period comprises:

an instruction configured to detect a time period when the plurality of manufacturing apparatuses were used in parallel;

an instruction configured to detect one of the manufacturing apparatuses having a low yield period when yields are lower than a yield threshold value and the low yield period; and an instruction configured to identify one of the manufacturing apparatuses having a significant difference in yield from the other manufacturing apparatus during the low yield period as the low-yield-period apparatus, and identify the low yield period as being the significantly lower yield period.

18. The computer-readable medium including computer program product of claim 17, wherein the instruction configured to detect one of the manufacturing apparatuses having a low yield period when yields are lower than a yield threshold value and the low yield period comprises:

an instruction configured to determine whether a group of processed objects is good or defective by comparing a yield of a group of objects processed by one of the manufacturing apparatuses with the yield threshold value; and an instruction configured to identify a certain period as being the low yield period when a plurality of groups of the processed objects are determined to be substantially consecutively defective for the certain period.

19. The computer-readable medium including computer program product of claim 16, wherein the instruction configured to identify the downward-tendency apparatus comprises:

an instruction configured to detect one of the manufacturing apparatuses which has a downward tendency in recent yield trend compared with a yield-trend threshold value; and an instruction configured to identify one of the manufacturing apparatuses which has a significant difference in recent yield trend from the other manufacturing apparatus as the downward-tendency apparatus.

20. The computer-readable medium including computer program product of claim 16, wherein the warnings are issued in levels depending on whether or not the significantly lower yield period of the low-yield-period apparatus is currently continuing, and whether or not the low-yield-period apparatus has a significant downward tendency in yield compared with the other manufacturing apparatus.

21. The computer-readable medium including computer program product of claim 16, wherein the instruction configured to identify a low-yield-period apparatus comprises an instruction configured to go back to past to compare the yields by use of past yield data.

22. A computer-readable medium including computer program product for detecting failure of manufacturing apparatuses, comprising:
- an instruction configured to identify a low-yield-period apparatus having a significantly lower yield period compared with other manufacturing apparatus and the significantly lower yield period by comparing yields of a plurality of manufacturing apparatuses used in parallel in a specific manufacturing process for each time period when the manufacturing apparatuses were used;
- an instruction configured to identify a downward-tendency apparatus having a significant downward tendency in yield compared with the other manufacturing apparatus by comparing recent yield trends of the plurality of manufacturing apparatuses;
- an instruction configured to issue multi-level warnings to the low-yield-period apparatus and the downward-tendency apparatus;
- an instruction configured to examine whether or not maintenance, inspection, repair or component replacement was performed on the low-yield-period apparatus and whether or not operating conditions for the low-yield-period apparatus have been changed before and after the significantly lower yield period identified by the low-yield detecting portion; and
- an instruction configured to estimate a cause of low yield in the low-yield-period apparatus based on results of the examining.

* * * * *